United States Patent [19]

Sogame

[11] Patent Number: 4,673,282
[45] Date of Patent: Jun. 16, 1987

[54] ELECTROPHOTOGRAPHIC COPYING APPARATUS

[75] Inventor: Masakazu Sogame, Toyokawa, Japan

[73] Assignee: Minolta Camera Kabushiki Kaisha, Osaka, Japan

[21] Appl. No.: 770,384

[22] Filed: Aug. 28, 1985

[30] Foreign Application Priority Data

Aug. 29, 1984 [JP] Japan ................................ 59-181092

[51] Int. Cl.$^4$ ............................................. G03G 15/00
[52] U.S. Cl. .................. 355/14 E; 355/3 R; 355/14 R; 355/7
[58] Field of Search .............. 355/7, 3 R, 71, 14 R, 355/14 E, 1

[56] References Cited

U.S. PATENT DOCUMENTS

| 4,046,467 | 9/1977 | Laskowski et al. | 355/3 R X |
|---|---|---|---|
| 4,215,929 | 8/1980 | Sato et al. | 355/7 |
| 4,256,400 | 3/1981 | Komori et al. | 355/71 X |
| 4,338,020 | 7/1982 | Yukawa et al. | 355/14 SH X |
| 4,384,272 | 5/1983 | Tanaka et al. | 382/50 |
| 4,582,417 | 4/1986 | Yagasaki et al. | 355/7 |
| 4,585,332 | 4/1986 | Shenoy | 355/14 SH X |

FOREIGN PATENT DOCUMENTS

| 54-2134 | 1/1979 | Japan . |
|---|---|---|
| 57-29060 | 2/1982 | Japan . |
| 57-45564 | 3/1982 | Japan . |
| 57-124373 | 8/1982 | Japan . |
| 57-124374 | 8/1982 | Japan . |

*Primary Examiner*—A. C. Prescott
*Attorney, Agent, or Firm*—Price, Gess & Ubell

[57] ABSTRACT

An electrophotographic copying apparatus provided with a light receiving device disposed in a light path for receiving the light from the original document, a light shielding device disposed before the light receiving device and capable of altering a light receiving range of the light receiving device, a device for controlling a light shielding amount of the light shielding device so as to correspond to a size of the original document, and a device for controlling the image forming device based on outputs of the light receiving device.

10 Claims, 8 Drawing Figures

4,673,282

ELECTROPHOTOGRAPHIC COPYING APPARATUS

BACKGROUND OF THE INVENTION

The present invention generally relates to a copying apparatus and more particularly, to an electrophotographic copying apparatus with an improved exposure amount control for higher accuracy in the density control of the copy.

Conventionally, there has been proposed a copying apparatus provided with an exposure amount control arrangement adapted to detect a reflected light amount or transmitted light amount of an original document for automatically controlling the exposure amount with respect to the original document according to the detected light amount, thereby to achieve optimum density, i.e., dark and light portions corresponding to the original document in copying.

In connection with the above, for example, in Japanese Patent Laid-Open Application Tokkaisho Nos. 57-29060, 57-124373 and 57-124374, there are disclosed arrangements in which a photo-detecting element is disposed outside the center of a light path in a position after an image forming optical system so as to control the exposure amount according to output signals of the photo-detecting element. However, since the above photo-detecting system can detect only the amount of reflected light from a very limited part of the original document, it is impossible to obtain data correctly reflecting the overall state at the dark and light portions of the original document, and thus, an accurate exposure control may not be effected.

With respect to the above point, in Japanese Patent Laid-Open Application Tokkaisho No. 57-2134, there is proposed an exposure control arrangement in which a plurality of photo-detecting elements are disposed to correspond to the widthwise direction of an original document (or original document platform) at positions optically conjugated with respect to the image forming surface of a photosensitive member or photoreceptor, so as to control the exposure amount by generating the respective outputs of such photo-detecting elements. In the above known system, although a comparatively accurate exposure control may be effected since the degrees of dark portions and light portions in the widthwise direction of the original document are detected, it becomes necessary to cause a mirror or the like for directing light toward the photo-detecting elements, uniformity in the sensitivity is required for the respective photodetecting elements, with simultaneous complication of the control means. Another problem related to the above conventional system is such that, depending on the original document sizes, some of the photo-detecting elements receive reflected light not from the original document, but from an original document cover, and thus, erroneous data can be undesirably taken into account.

Furthermore, in Japanese Patent Laid-Open Application Tokkaisho No. 57-45564, there is disclosed an exposure amount control device which is so arranged that, by causing a photo-detecting sensor to scan by a sensor driving unit in a direction intersecting at right angles with an optical system moving direction so as to prepare a histogram corresponding to the density distribution at respective points in the widthwise direction of an original document, a characteristic pattern of said histogram is derived for controlling the exposure amount.

However, the known device as described above has such problems that, besides the fact that the driving unit for causing the photo-detecting sensor to scan in the direction normal to the optical system moving direction must be constructed on a large scale, density of a part other than the original document, for example, density of an original document cover taken into the histogram as in the arrangement described earlier, unless the scanning width is accurately controlled according to the original document.

As described so far, conventional image density control arrangements have disadvantages in that, since dark and light portions only at a limited part of the original document can be detected or dark and light portions on parts other than the original document can not be accurately detected, thus making it impossible to correctly control the darkness or lightness of copied images.

SUMMARY OF THE INVENTION

Accordingly, as essential object of the present invention is to specific provide an electrophotographic copying apparatus which is capable of effecting density control at a higher accuracy by detecting dark and light portions for the density of an original document at a proper rate according to sizes of the original documents.

Another important object of the present invention is to provide an electrophotographic copying apparatus of the above described type which is simple in construction and accurate in functioning.

In accomplishing these and other objects, according to the present invention, there is provided an electrophotographic copying apparatus provided with means for forming an image on a photosensitive member, with the image forming means including a light source for illuminataing an original document, an optical system for projecting a light image of the original document onto the photosensitive member so as to form an electrostatic latent image of the original document thereon, a corona charging means for uniformly charging the photosensitive member prior to the projection of the light image of the original document, and characterized in that there are provided a light receiving means disposed in a light path for receiving the light from the original document, a light shielding means disposed before the light receiving means and capable of altering a light receiving range of said light receiving means, a first means for controlling a light shielding amount of said light shielding means so as to correspond to a size of the original document, and a second means for controlling said image forming means based on outputs of said light receiving means.

More specifically, according to one preferred embodiment of the present invention, it is arranged that a light receiving means is disposed at an angle capable of viewing an entire length in the widthwise direction of a maximum sized original document, and a slit means for supporting a slit extending in parallel relation with the widthwise direction of the original document is provided at a front portion of the light receiving means, while a slit length control means for altering the length of said slit in correspondence to the original document width is also provided so as to cause the light measuring range of the light receiving means to correspond to the original document width.

In the present invention, the slit length is altered by the slit length control means so as to correspond, for example, to original document size of A4 or B4, with the result that the light measuring range of the light receiving means comes to be coincident with the entire length of the original document width, and thus, it becomes possible for the light receiving means to detect the state of dark and light portions over the entire width of the original document.

In the manner as described above, the light receiving amount of the light receiving means, and accordingly, the detecting output thereof comes to accurately reflect the state of dark and light portions over the whole width of the original document, thus making it possible to correctly control the degree of darkness and lightness or density of the copied images.

It is to be noted here that, although the degree of darkness and lightness of the copied images can be controlled by altering the intensity of light illuminating the original document, it may also be controlled through alteration of a charge amount for a photoreceptor drum in a so-called electrophotographic copying apparatus.

The control of the charge amount should preferably be effected through employment of scorotron (which includes a control grid between a wire and the photoreceptor) as a corona charger by arranging to control a grid voltage. Moreover, the controls for the illuminating light and charge amount may be effected simultaneously.

Meanwhile, since the output of the light receiving means represents the density of the copied images, it may be also utilized for the control of the replenishing amount of toner to a developing device.

According to the present invention, it is possible to detect the state of dark and light portions over the entire width of the original document at all times, and moreover, since it is only necessary to provide means for controlling alteration of slit length of a slit means with respect to the light receiving means, the object of the present invention can be achieved through a simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
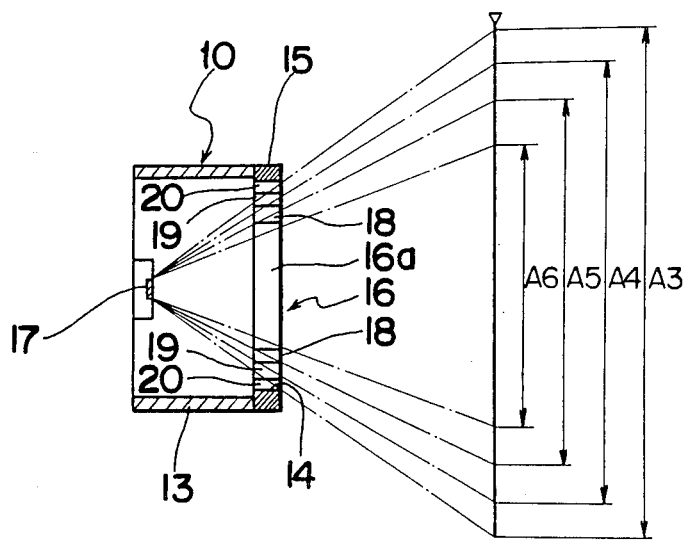
FIG. 1 is a sectional diagram in a horizontal direction showing construction of a light receiving portion according to one preferred embodiment of the present invention.

Before the description of the present invention proceeds, it is to be noted that like parts are designated by like reference numerals throughout the accompanying drawings.

Figure 2:
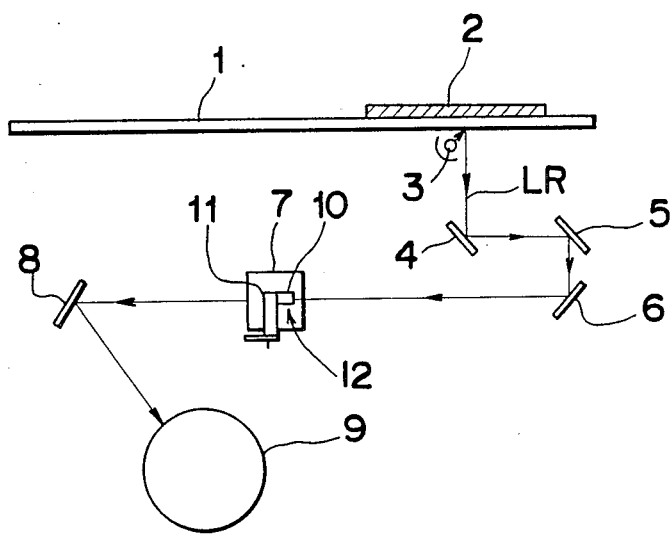
FIG. 2 is a schematic diagram showing an optical system of an electrophotographic copying apparatus according to the present invention.

Referring now to the drawings, there is shown in FIG. 2 the general construction of an electrophotographic copying apparatus to which the present invention may be applied. In FIG. 2, an original document 2 placed on an original document platform 1 is subjected to a slit exposure by an exposure lamp 3 disposed below and adjacent to the platform 1, and reflected light $L_R$ from the original document 2 is successively reflected by first, second and third mirrors 4, 5 and 6 so as to be incident upon an image forming lens system 7, which forms an image of the original document 2 on a rotatable photosensitive or photoreceptor drum 9 through a fourth mirror 8. Although not particularly shown, various processing stations such as a corona charger for uniformly charging the surface of the photoreceptor drum 9 prior to the image exposure, a developing device for developing anelectrostatic latent image of the original document formed on the surface of the photoreceptor drum into a visible image, a transfer device for transferring the visible image onto copy paper sheets, etc. are sequentially disposed around the photoreceptor drum 9 in a known manner.

Figure 3:
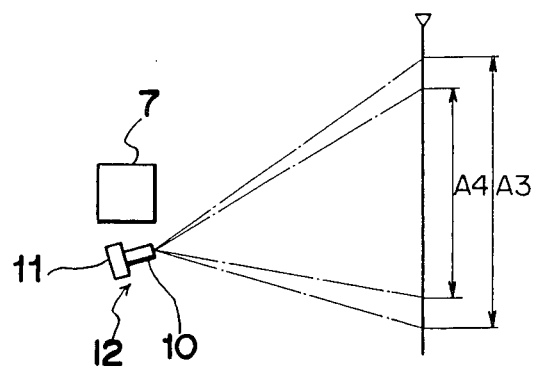
FIG. 3 is a schematic top plan view showing the relation between an image forming system and the light receiving portion in the copying apparatus of FIG. 2.

Referring also to FIG. 3, at a side portion of the image forming lens system 7, there is provided a light measuring means 12 which includes a light receiving portion 10 for receiving the reflected light $L_R$ from the original document 2 subjected to the slit exposure and a support member 11 for supporting said light receiving portion 10.

Figure 4:
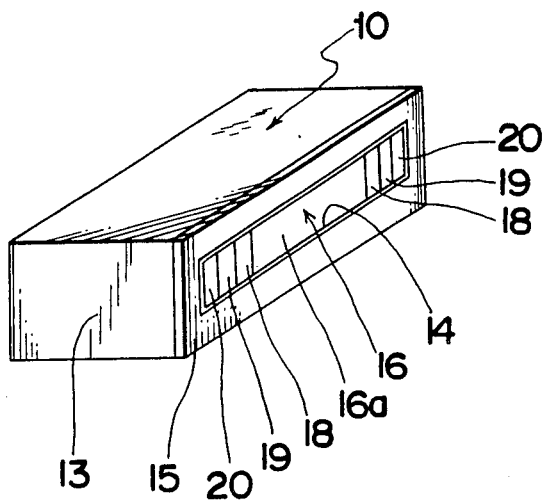
FIG. 4 is a perspective view of the light receiving portion in FIG. 3 as viewed from the front portions thereof.

As specifically shown in FIG. 4, the light receiving portion 10 further includes a cubic rectangular casing mounted at the front face of said casing 13 and formed with a slit 14 corresponding to a widthwise direction of the original document 2. This slit 14 is so provided that its lengthwise direction coincides with the widthwise direction of the original document 2, with a liquid crystal panel 16 being fitted into said slit 14.

As shown in FIG. 1, at an inner portion of the casing 13, a light receiving means 17 such as photo-diodes, etc. is supported by a support member for receiving the reflected light $L_R$ in the widthwise direction of the original document 2, incident thereupon through the liquid crystal panel 16. The light receiving means 17 is so set in its visual angle that it can receive the reflected light extending over the entire width of the original document 2 of a maximum size, for example, in A3 size, through said slit 14, and when the size of the original document is altered from A3 to A4, A5 to A6, the liquid crystal panel 16 is driven and controlled as described hereinbelow so as to change the slit length defined by said liquid crystal panel 16.

In the above liquid crystal panel 16, at opposite sides of its central transparent portion 16a having a size capable of receiving the reflected light extending over the entire width in the widthwise direction of the original document size for A6, there are successively provided three pairs of liquid cyrstal patterns 18 and 18, 19 and 19, and 20 and 20 as shown in FIGS. 1 and 4. When the outer two pairs of liquid crystal patterns 19 and 19, 20 and 20 are driven, without driving of the inner pair of liquid cyrstal patterns 18 and 18, the slit length is determined by the central transparent portion 16a and the transparent liquid crystal patterns 18 and 18, whereby the reflected light extending over the entire width in the widthwise direction, for example, of the original document size for A5 can be received. Subsequently, in the similar manner as described above, in the case where the original document size is A4, the outer one pair of liquid crystal patterns 20 and 20 is driven and shaded for setting the slit length to correspond to A4 size, while in the case where the original document size is A3, no liquid crystal patterns 18 and 18, 19 and 19, and 20 and 20 are driven, and thus, the slit length is set to be generally equal to the entire length of the liquid crystal panel 16.

Figure 5:
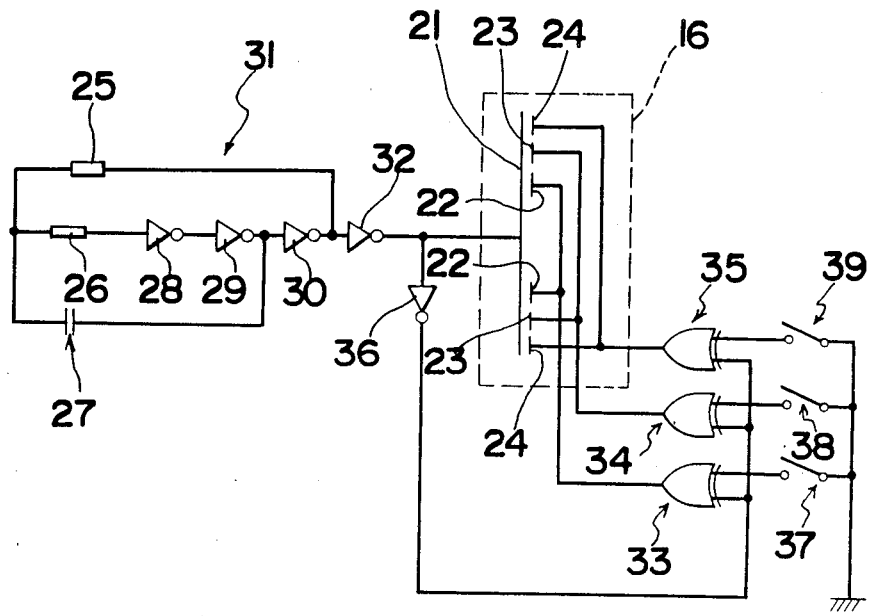
FIG. 5 is an electrical circuit diagram showing a driving and control circuit of a liquid crystal panel.

Reference is made to FIG. 5 showing the general construction of a driving and control circuit for the liquid crystal panel 16 referred to above.

The liquid crystal panel 16 includes a common electrode 21 provided to extend generally over its entire length in the longitudinal direction thereof, and three pairs of segment electrodes 22 and 22, 23 and 23, and 24 and 24 each provided for the corresponding pairs of the liquid crystal patterns 18 and 18, 19 and 19, and 20 and 20. For driving the respective liquid crystal patterns, there is provided a known square wave generating stage 31 which is constituted by a combination of two resistors 25 and 26, a capacitor 27 and inverters 28, 29 and 30 in three stages connected to each other as shown, with a square wave of 32 Hz oscillated by the above square wave generating stage 31 adapted to be applied to the common electrode 21 through an inverter 32 having a buffer function.

Meanwhile, the pairs of segment electrodes 22 and 22, 23 and 23, and 24 and 24 are respectively connected to output sides of exclusive OR circuits 33, 34 and 35, while the square wave inverted through an inverting inverter 36 connected in series to the inverter 32 having the buffer function, is applied to one input of each of said exclusive OR circuits 33, 34 and 35. The other inputs of the exclusive OR circuits 33, 34 and 35 are respectively grounded through size detecting switches 37, 38 and 39.

Figure 6:
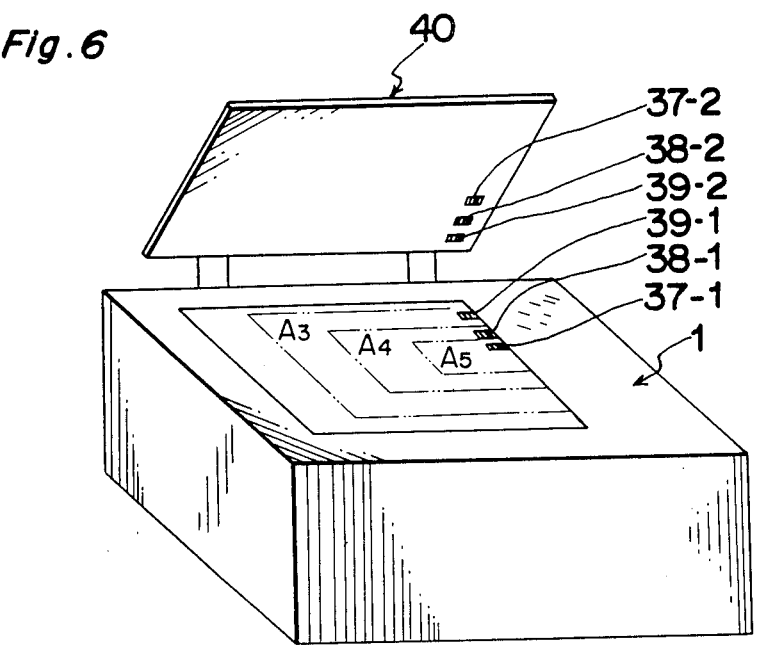
FIG. 6 is a perspective view of the copying apparatus, with an original document cover thereof opened for showing the construction of size detecting switches.

These size detecting switches 37, 38 and 39 are respectively constituted, for example as shown in FIG. 6, by transparent electrodes 37-1, 38-1 and 39-1 provided on the surface of the original document platform 1, and corresponding electrodes 37-2, 38-2 and 39-2 provided on the inner surface of an original document cover 40 in positions respectively coinciding with said transparent electrodes 37-1, 38-1 and 39-1 upon closing or turning down of said original document cover 40. Such size detecting switches 37, 38 and 39 are so disposed as to correspond, for example, to A6, A5, A4 and A3 sizes. More specifically, it is so arranged that, when an original document 2 of A6 size is set on the original document platform 1, all the size detecting switches 37, 38 and 39 are turned on upon closing of the original document cover 40. In the case of an original document of A5 size, the innermost switch 37 is turned off, with the two outer switches 38 and 39 are turned on. When an original document size is A4, the inner two size detecting switches 37 and 38 are turned off, with only the outer switch 39 being turned on, while in the case of an original document of A3 size, all the size detecting switches 37, 38 and 39 are turned off.

Accordingly, by logically combining the on/off state of these size detecting switches 37, 38 and 39, it is possible to detect the size of the original document 2 set on the original document platform 1.

Now, if an original document 2 of A5 size is set on the original document platform 1 and the original document cover 40 is closed, the innermost size detecting switch 37 is turned off, with the other two size detecting switches 38 and 39 turned on.

Here, referring back to FIG. 5, to the two sets of segment electrodes 23 and 23, and 24 and 24 corresponding to the two size detecting switches 38 and 39 in the on state, the square wave inverted by the inverting inverter 36 is applied through the exclusive OR circuits 34 and 35. Thus, driving of the liquid crystal patterns 19 and 19, and 20 and 20 by the square wave of 32 Hz is effected with respect to the common electrode 21 to which the non-inverted square wave is applied, and the outer two liquid crystal patterns 19 and 19, and 20 and 20 are rendered to be opaque, with only the innermost liquid crystal patterns 18 and 18 being held in the transparent state.

Consequently, the slit length is set to correspond to A5 size, and the light receiving means 17 is able to receive the reflected light extending over the entire width of the original document 2 for A5 size. Thereafter, in the similar manner as above, in the case of an original document of A4 size, the outermost liquid cyrstal patterns 20 and 20 are rendered to be opaque, while in the case of an original document of A3 size, all the liquid crystal patterns 18 and 18, 19 and 19, and 20 and 20 are kept to be transparent. On the contrary, in the case of an original document of A6 size, all the liquid crystal patterns 18 and 18, 19 and 19, and 20 and 20 are rendered to be opaque. In other words, the slit length defined by the liquid crystal panel 16 is altered to correspond to the size of the original document 2 at a relation of 1:1, and thus, the state of dark and light portions extending over the entire length in the widthwise direction of the original document 2 is to be correctly detected by the light receiving means 17, according to the sizes of the original documents at all times.

Figure 7:
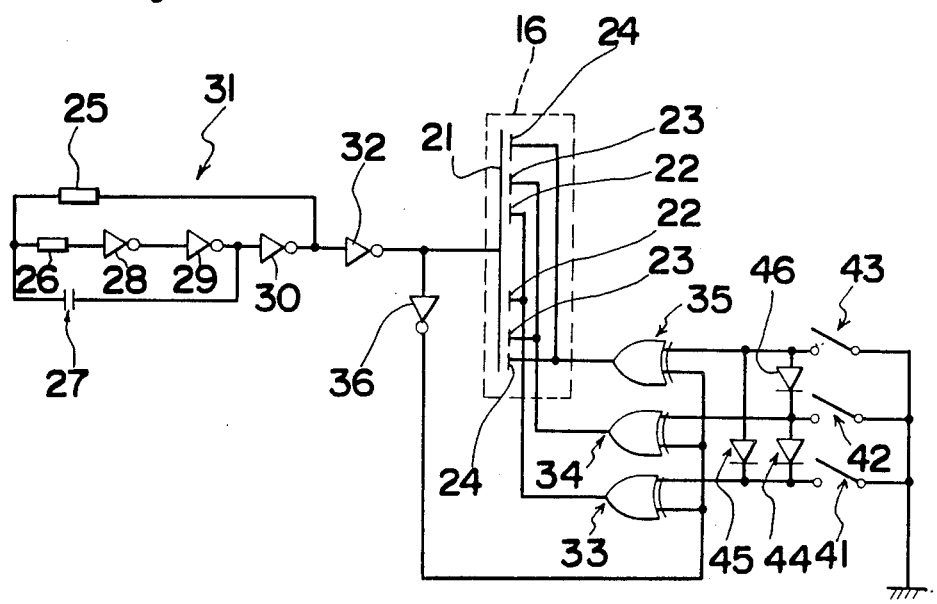
FIG. 7 is an electrical circuit diagram showing another driving and control circuit of a liquid crystal panel.

In FIG. 7, there is shown a modification of the driving circuit for the liquid crystal panel 16 described with reference to FIG. 5.

In the modified circuit of FIG. 7, the size detecting switches 37, 38 and 39 described as employed in the circuit of FIG. 5 are replaced by manual size selecting switches 41, 42 and 43. According to the foregoing embodiment, these size selecting switches 41, 42 and 43 are selecting switches corresponding to A6, A5 and A4 sizes, and for example, when the size selecting switch 41 is turned on, the other input of the exclusive OR circuit 33 for driving the segment electrodes 22 and 22 is connected to the ground side, while the exclusive OR circuit 34 connected to the segment electrodes 23 and 23 has its other input connected to the ground side through a diode 44, and the exclusive OR circuit 35 connected to the segment electrodes 24 and 24 has its other input connected to the ground side through a diode 45. As a result, the inverted square waves are applied to all of the segment electrodes 22 and 22, 23 and 23, and 24 and 24, and thus, the liquid crystal patterns 18 and 18, 19 and 19, and 20 and 20 are driven to become opaque. Accordingly, in this case, the reflected light extending over the entire length in the widthwise direction of the original document 2 for A6 size is to be received by the light receiving means 17 through the transparent portion 16a of the liquid crystal panel 16.

Meanwhile, when the size selecting switch 42 for A5 size is turned on, the other input of the exclusive OR circuit 34 is connected to the ground side, and the other input of the exclusive OR circuit 35 is connected to the ground side through a diode 46, but the other input of the exclusive OR circuit 33 is to be cut off from the ground side by the diode 44. Consequently, the innermost liquid crystal patterns 18 and 18 are not driven, with the outer two liquid crystal patterns 19 and 19, and 20 and 20 being driven, and thus, the slit length is set to be long to correspond to A5 size.

Furthermore, when the size selecting switch 43 for A4 size is selected, only the outermost liquid crystal patterns 20 and 20 are driven so as to set the slit length to correspond to A4 size.

In the case where all the switches are turned off, none of the liquid crystal patterns are driven, and thus, the slit length corresponds to A3 size.

Figure 8:
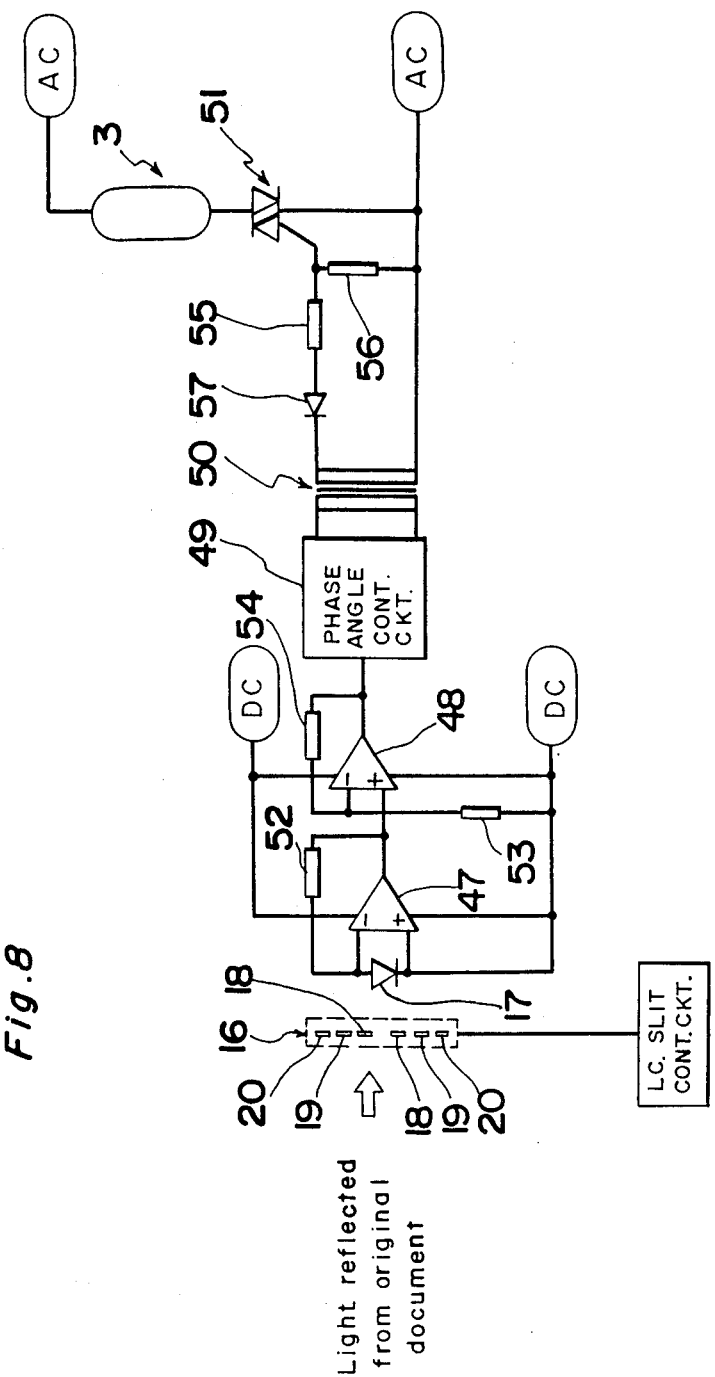
FIG. 8 is an electrical circuit diagram showing the construction of an exposure amount control circuit of the copying apparatus according to the present invention.

Subsequently, referring also to FIG. 8, the exposure amount control in the case where the light measuring control system as described so far is employed, will be briefly explained.

As described earlier, when the reflected light for the entire width of the original document 2 is received by the light receiving means 17 through the liquid crystal panel 16 by which the slit length is altered and controlled, the light receiving means 17 produces an output proportional to the received light amount. The output of this light receiving means 17 is altered from current to voltage by an operational amplifier 47 at a first stage coupled to said light receiving means 17 with a resistor 52 connected therebetween, and is amplified by an operational amplifier 48 at a next stage connected with resistors 53 and 54 as shown so as to be subsequently applied to a phase angle control circuit 49 coupled to said amplifier 48. The construction itself of this phase angle control circuit 49 is conventional, and is arranged to function so that when the light receiving amount of the light receiving means 17 is large, i.e., when the density of the original document is low or light, voltage for the exposure lamp is lowered by lagging the phase angle, while when the light receiving amount is small, the phase angle is caused to lead so as to raise the exposure lamp voltage. More specifically, this phase angle control circuit 49 sets the phase angle corresponding to the light receiving amount for pulse-driving the pulse transformer 50 at that timing, thereby to trigger a triac 51 provided for the exposure lamp 3 and coupled to the pulse transformer 50 through a diode 57 and resistors 55 and 6, through the pulses produced by said pulse transformer 50, and control the driving voltage of the exposure lamp 3 for the control of the exposure amount. In the manner as describeda above, proper exposure corresponding to densities of original documents of respective sizes is effected for uniform control of image densities.

It is to be noted here that, in the foregoing embodiment, although the slit length is arranged to be controlled through employment of the liquid crystal, the present invention is not limited in its application to such an embodiment alone, but may be modified in various ways.

The means for altering the slit length may, for example, be modified to be constituted by a combination of a shielding member, and a driving means such as a motor, solenoid, etc. for altering the size of the shielding member in the longitudinal direction of the slit, or PLZT shutter (name used in trade and manufactured by Motorola) constituted by combining two sheets of polarizing plates and a PLZT electro-optical ceramic member may be effectively utilized therefor.

It should also be noted there that, depending on the kinds of the copying apparatus, directions for setting original documents are adapted to be changed according to the sizes of the original documents, and in such a case, the term "width of the original document" should be understood as representing a length in the direction intersecting at right angles with the setting direction.

Although the present invention has been fully described by way of example with reference to the accompanying drawings, it is to be noted there that various changes and modifications will be apparent to those skilled in the art. Therefore, unless otherwise such changes and modifications depart from the scope of the present invention, they should be construed as being included therein.

What is claimed is:

1. In an improved electrophotographic copying apparatus capable of reproducing copies of variable size original documents having a light source for illuminating the original document, means for projecting an image of the original document onto a photosensitive member and means for varying the image forming contrast for the copy to duplicate the original, the improvement comprising:
   means for monitoring the light reflected from the original document to produce signals to be applied to the varying means;
   means for determining the size of the original document and producing a corresponding size signal; and
   means for limiting the light transmitted to the monitor means in response to the size signal.

2. The invention of claim 1 wherein the means for limiting includes a liquid crystal display panel that can be selectively darkened to limit the light transmitted therethrough.

3. The invention of claim 2 wherein the electrophotographic copying apparatus includes a transparent platform and a cover member and the means for determining includes a size detecting member mounted adjacent the platform.

4. In an improved electrophotographic copying apparatus capable of reproducing copies of variable size original documents having a light source for illuminating the original document, means for projecting an image of the oroginal document onto a photosensitive member and means for varying the image forming contrast for the copy to duplicate the original, the improvement comprising:
   means for monitoring the light reflected from the original document to produce signals to be applied to the varying means;
   means for determining the size of the original document and producing a corresponding size signal;
   means for limiting the light transmitted to the monitor means in response to the size signal; and
   means for controlling the means for varying the image forming contrast in response to the means for monitoring signals.

5. The invention of claim 4 wherein the means for limiting includes a liquid crystal display panel that can be selectively darkened to limit the light transmitted therethrough.

6. The invention of caim 5 wherein the electrophotographic copying apparatus includes a transparent platform and a cover member and the means for monitoring includes a size detecting member mounted adjacent the platform.

7. The invention of claim 4 wherein the means for limiting is a light shelding member allowing light to pass therethrough in a slit-like configuration and capable of varying the length of the slit.

8. The invention of claim 4 wherein in the means for controlling includes controlling the amount of light emitted by the light source.

9. The invention of claim 7 wherein said light shielding means is a plurality of liquid crystal elements positioned in the slit-like configuration.

10. The invention of claim 7 wherein the means for determining the size of the original document includes applying the size signal to means for limiting to control the light shielding member's slit length.

11. An arrangement for illuminating an original document by a light source for transmitting an image of an original document to a photoreceptor, said arrangement comprising a light receiving means disposed in a light path for receiving the light from the original document, a light shielding means disposed before the light receiving means and capable of altering a light receiving range of said light receiving means, a first means for controlling a light shielding amount of said light shielding means so as to correspond to a size of the original document, and a second means for controlling the light emitting amount of said light source based on outputs of said light receiving means.

12. An arrangement as claimed in claim 11, wherein said light shielding means is a light shielding member allowing light to pass therethrough in a slit-like configuration and capable of varying its slit length.

13. An arrangement as claimed in claim 11, wherein said light shielding means is made of a combination of a plurality of liquid crystal elements.

14. An arrangement as claimed in claim 11, further comprising means for measuring sizes of the original documents, measuring signals of said means being supplied to the first light shielding control means.

* * * * *

UNITED STATES PATENT OFFICE
CERTIFICATE OF CORRECTION

Patent No. 4,673,282  Dated  June 16, 1987

Inventor(s)  Masakazu Sogame

It is certified that error appears in the above-identified patent and that said Letters Patent are hereby corrected as shown below:

Column 4, line 31, delete "anelectrostatic" and insert -- an electrostatic --.

Column 7, line 59, delete "describeda" and insert --described--.

Column 8, line 19, delete "there" and insert --here--.

Signed and Sealed this

Seventeenth Day of January, 1989

Attest:

DONALD J. QUIGG

Attesting Officer  Commissioner of Patents and Trademarks